(12) United States Patent
Bae

(10) Patent No.: US 6,757,752 B2
(45) Date of Patent: Jun. 29, 2004

(54) MICRO CONTROLLER DEVELOPMENT SYSTEM

(75) Inventor: Jong-Hong Bae, Ichon-shi (KR)

(73) Assignee: Hynix Semiconductor INC, Ichon-shi (KR)

( * ) Notice: Subject to any disclaimer, the term of this patent is extended or adjusted under 35 U.S.C. 154(b) by 277 days.

(21) Appl. No.: 10/043,291

(22) Filed: Jan. 14, 2002

(65) Prior Publication Data

US 2003/0120839 A1 Jun. 26, 2003

(30) Foreign Application Priority Data

Dec. 24, 2001 (KR) .......................................... 2001-84263

(51) Int. Cl.$^7$ .............................................. G06F 13/14
(52) U.S. Cl. .............................. 710/36; 710/33; 711/2; 711/211
(58) Field of Search ............................. 710/36, 33, 52, 710/14; 711/2, 200, 211

(56) References Cited

U.S. PATENT DOCUMENTS

| | | | | |
|---|---|---|---|---|
| 5,115,511 A | * | 5/1992 | Nilsson et al. .................. | 713/1 |
| 5,127,095 A | * | 6/1992 | Kadono ....................... | 711/211 |
| 5,197,020 A | * | 3/1993 | Schwartz .................... | 708/317 |
| 5,291,609 A | * | 3/1994 | Herz ........................... | 710/52 |
| 5,584,041 A | * | 12/1996 | Odawara et al. .............. | 710/14 |

FOREIGN PATENT DOCUMENTS

| | | | | |
|---|---|---|---|---|
| KR | 2001-4167 | 1/2001 | ............. | G06F/9/44 |
| KR | 2001-108776 | 12/2001 | ........... | G06F/13/00 |

* cited by examiner

Primary Examiner—Rehana Perveen
Assistant Examiner—Harold Kim
(74) Attorney, Agent, or Firm—Jacobson Holman PLLC

(57) ABSTRACT

The present invention relates to a micro controller development system (MDS) capable of helping a development of hardware and related software of a micro control unit (MCU). The micro controller development system according to the present invention includes: a micro controller including first and second data I/O ports; a memory unit for storing commands for a program to be transplanted to an internal code ROM in the micro controller; a switch for transferring address signals to the memory unit in response to a first control signal and for transferring the commands from the memory unit to the micro controller in response to the first control signal, wherein the address signals are transferred via the first data I/O port and wherein the commands are transferred via the second data I/O port; a first I/O interface unit for performing data input or output between the first data I/O port and a single data port of an external device in response to a second control signal; and a second I/O interface unit for performing data input or output between the second data I/O port and the single data port external device in response to the second control signal.

4 Claims, 4 Drawing Sheets

MICRO CONTROLLER DEVELOPMENT SYSTEM

FIELD OF THE INVENTION

The present invention relates to a development of a semiconductor chip; and, more particularly, to a micro controller development system (MDS) capable of helping a development of hardware and related software of a micro control unit (MCU).

DESCRIPTION OF RELATED ART

To test a manufactured micro control unit (MCU) or develop the MCU for a special function, a micro controller development system (MDS) has been usually used. Recently, a very large scale integration (VLSI) is rapidly developed and most of recently designed MCUs have a plurality of code read only memories (ROMs) with the development of integration.

Therefore, the MDS may make it possible to fetch a program to be transplanted to a code ROM of the MCU from an external ROM or a random access memory (RAM).

FIG. 1A is a circuit diagram illustrating a conventional MDS and FIG. 1B is a timing diagram showing each signal of the MDS in FIG. 1A. The MCU contains an optional Eva-chip for carrying out a fetch function, which transplants a program from an external ROM and RAM to the code ROM in the MCU. The Eva-chip is an additional chip for an I/O interface for address and command signals needed in transplanting data to a code ROM in the MCU.

Referring to FIGS. 1A and 1B, the MDS includes a MCU chip 10 and a memory 20, such as a ROM or a RAM, to store commands for transplanting a program to a code ROM in the MCU chip 10. The MCU chip 10 has data input units 11a and 11b and data output units 12a and 12b for a data processing with an external device (not shown) and further has a command input unit 13. The data are inputted and outputted by the data input units 11a and 11b and the data output units 12a and 12b via data I/O pins 12 and 18 of the MCU chip 10.

On the other hand, when a program is transplanted to the code ROM, the MCU chip 10 outputs an n-bit address signal ADD to the memory 20 through an address bus and the memory 20 outputs a p-bit command signal, which corresponds to the address signal ADD, to the MCU chip 10 after a predetermined access time ($t_{ACC}$) in response to a control signal outputted from the MCU chip 10. The outputted command signal is sampled to a MCU internal command bus by a command input unit 13, being synchronized with a control signal IO2Inst.

At this time, the MCU 10 used in MDS needs a pin 14 for outputting the n-bit address ADD to transplant data to the code ROM, a pin 19 for inputting the p-bit command (Inst) and a control signal output pin 16 for controlling the memory 20 as well as the data I/O pins 12 and 18 for the data input and output.

As above described, a conventional MDS needs not only an I/O port but also an additional port (Eva-chip) for transplanting a program to a code ROM within the MCU. Because of the additional port, it is difficult to simplify the structure of the MDS so a development cost is increased and an operation time is extended.

SUMMARY OF THE INVENTION

It is, therefore, an object of the present invention to provide a micro controller development system capable of employing an data I/O port of the MCU as a port for transplanting a program to a ROM within a micro control unit.

Another object of the present invention is to provide a micro controller development system (MDS) capable of preventing a collision between an inputted data and an outputted data.

In accordance with an aspect of the present invention, there is provided a micro controller development system, comprising: a micro controller including first and second data I/O ports; a memory unit for storing commands for a program to be transplanted to an internal code ROM in the micro controller; a switching means for transferring address signals to the memory unit in response to a first control signal and for transferring the commands from the memory unit to the micro controller in response to the first control signal, wherein the address signals are transferred via the first data I/O port and wherein the commands are transferred via the second data I/O port; a first I/O interface unit for performing data input or output between the first data I/O port and a single data port of an external device in response to a second control signal; and a second I/O interface unit for performing data input or output between the second data I/O port and the single data port external device in response to the second control signal.

BRIEF DESCRIPTION OF THE DRAWINGS

Other objects and aspects of the invention will become apparent from the following description of the embodiments with reference to the accompanying drawings, in which.

DETAILED DESCRIPTION OF THE INVENTION

Hereinafter, a micro controller development system according to the present invention will be described in detail referring to the accompanying drawings.

Figure 1A:
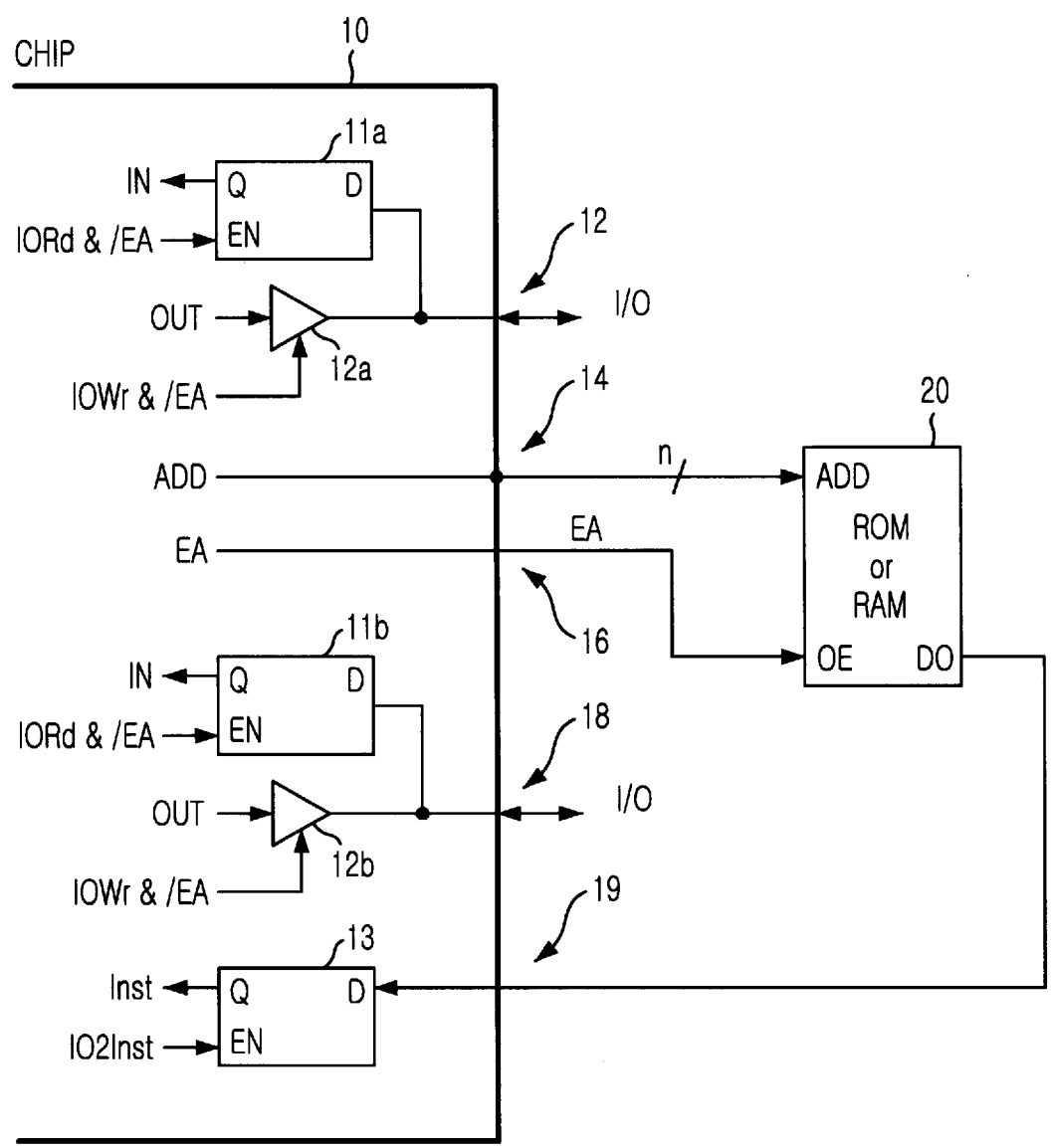
FIG. 1A is a circuit diagram illustrating a conventional micro controller development system (MDS)
Figure 1B:
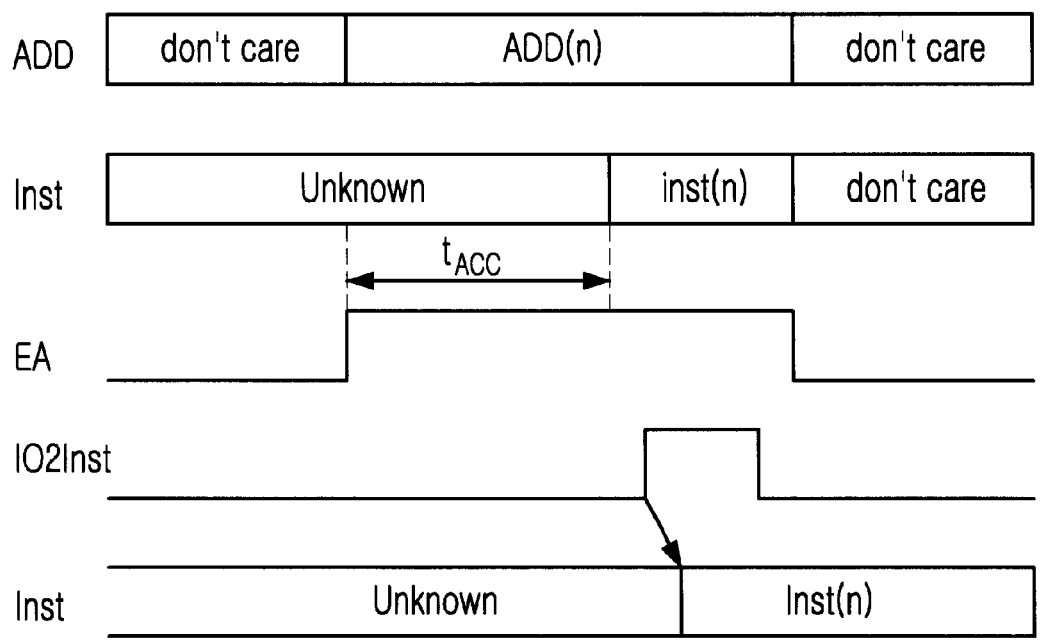
FIG. 1B is a timing chart of each signal of the MDS in FIG. 1A.
Figure 2:
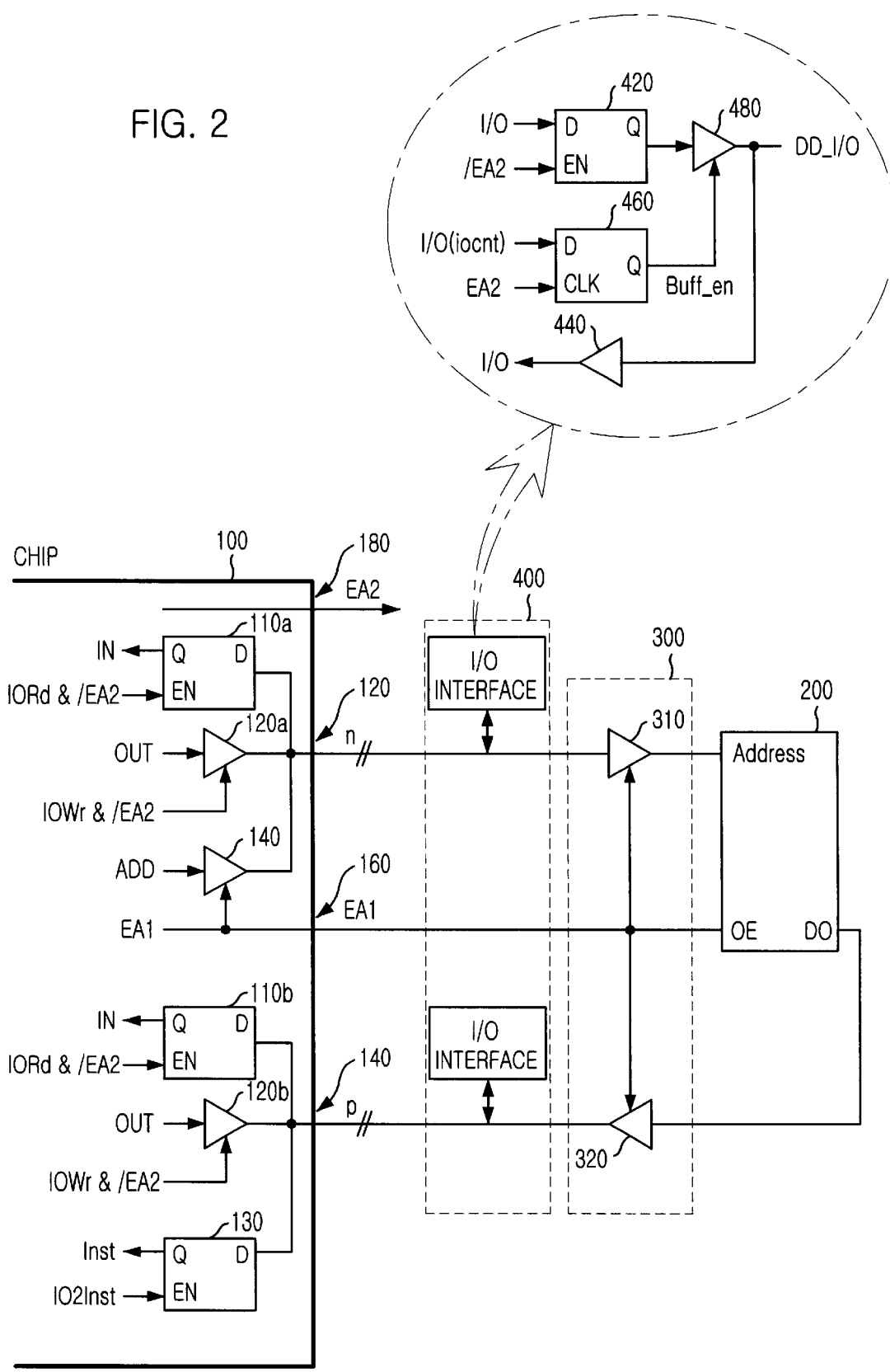
FIG. 2 is a block diagram showing the MDS in accordance with the present invention.

FIG. 2 is a block diagram showing a micro controller development system (MDS) in accordance with the present invention.

Referring to FIG. 2, the MDS includes a micro control unit (MCU) 100, first and second control signal ports 160 and 180 for first and second control signals EA1 and EA2 and first and second data I/O ports 120 and 140. A memory 200, such as a RAM or a ROM, stores instructions for transplanting a program to an internal code ROM within the MCU chip 100. Tri-state buffers 310 and 320 in a switching unit 300 transfers an address signal from the first data I/O port 120 to the memory 200 and transfers data from the memory 200 to the second data I/O port 140, respectively. Further, an I/O interface unit 400 is provided between the first and second data I/O ports 120 and 140 and an external device and the I/O interface unit 400 is controlled by the second control signal EA2 from the MCU 100.

On the other hand, the MCU 100 includes data input units 110a and 110b for inputting data from other external devices through the I/O interface unit 400 and data output units 120a and 120b for outputting data to other external devices. The MCU 100 further includes a tri-state buffer 140 to output the address signal to the memory 200 through the data I/O port 120.

The I/O interface unit 400 contains a controller to control input and/or output of data in response to the second control signal EA2. The I/O interface unit 400 performs data input and/or output between the first data I/O port 120 and an external device through a single data I/O port (DD_IO).

Especially, the I/O interface unit 400 includes a read driving unit, a write driving 440 and a read enable signal generating unit 460. The read driving unit, which includes a flip-flop 420 and a tri-state buffer 480, drives data transmitted from the first data I/O port 120 in response to the second control signal EA2. The write driving unit 440 transmits data transmitted from a single data port to the first and second data I/O ports 120 and 140, and a read enable signal generating unit 460 generates a read enable signal Buff_en for enabling the tri-state buffer 480.

The read driving means contains the flip-flop 420 receiving a reverse signal/EA2 of the second control signal (EA2), as an enable signal, and the tri-state buffer 480, which drives an output of the flip-flop 420 to a single data port DD_IO in response to the read enable signal Buff_en.

The read enable signal generating unit 460 receives a read control signal Iocnt, which is enabled in an output mode, via a data input terminal (D), and is comprised of a flip-flop where the second control signal EA2 is inputted to a clock input terminal (CLK).

As above-mentioned, the MDS of the present invention makes the first data I/O port 120 commonly used for an output port of an address (ADD), and also makes the second data I/O port 140 commonly used for an input port for program command fetch. At this time, for a timing controlling of each I/O signal recorded in the first and second data I/O ports 120 and 140, a switching unit 300 and an I/O interface unit 400 are provided.

Figure 3:
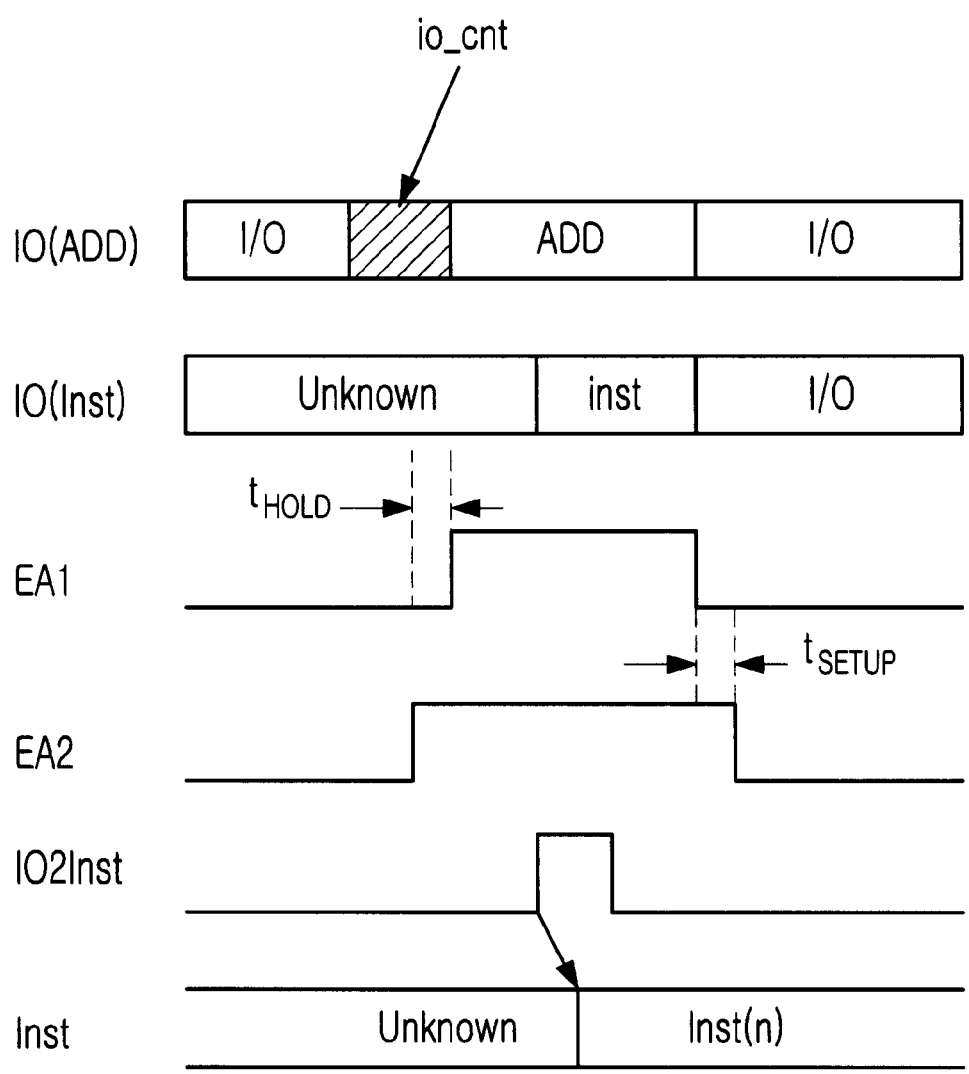
FIG. 3 is a timing chart of each signal in FIG. 2.

The switching unit 300 and the I/O interface unit 400 are controlled by the first control signal EA1 and the second control signal EA2, respectively. As shown in timing chart of FIG. 3, the second control signal EA2 is firstly enabled more than the first control signal (EA1) for accessing the memory 200 by a predetermined period ($t_{HOLD}$), and the second control signal EA2 is disabled after a predetermined period ($t_{SETUP}$).

Finally, as described in FIG. 2, the MDS of the present invention inputs and outputs the address signal ADD and the command Inst when the first control signal EA1 and the second control signal EA2 are logically in a "high" level through the first and second data I/O ports 120 and 140 and the switching unit 300.

When the n-bit address signal is not outputted, that is, the first control signal EA1 and the second control signal EA2 are logically in a "low level," data are mutually transmitted with an external device through the first and the second data I/O ports 120 and 140 and the I/O interface unit 400.

Also, the present invention provides the read enable signal generation unit 460 in the I/O interface unit 400 for preventing a collision between input and output data in the first and second data I/O ports 120 and 140.

The present invention realizes a MDS supplying circuit, which does not need an additional Eva-chip, and solves a problem of an additional I/O port in a conventional I/O control unit.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A micro controller development system, comprising:
   a micro controller including first and second data I/O ports;
   a memory unit for storing commands for a program to be transplanted to an internal code ROM in the micro controller;
   a switching means for transferring address signals to the memory unit in response to a first control signal and for transferring the commands from the memory unit to the micro controller in response to the first control signal, wherein the address signals are transferred via the first data I/O port and wherein the commands are transferred via the second data I/O port;
   a first I/O interface unit for performing data input or output between the first data I/O port and a single data port of an external device in response to a second control signal; and
   a second I/O interface unit for performing data input or output between the second data I/O port and the single data port of the external device in response to the second control signal,
   wherein each I/O interface unit includes:
      a first flip-flop for receiving data inputted from each I/O port and outputting the data in response to an inverse second control signal;
      a second flip-flop for receiving a read control signal, which is enabled in an output mode, and outputting an output in response to the second control signal;
      a first tri-state buffer for receiving an output of the first flip-flop in response to the output of the second flip-flop; and
      a first buffer for outputting the data, which is outputted from one of the micro controller and the memory unit, to each I/O port.

2. The micro controller development system in claim 1, wherein the first and the second control signals selectively enable the first and second I/O interface units and the switching unit.

3. The micro controller development system in claim 1, wherein the switching means including:
   a first tri-state buffer for transferring the address signals from the first data I/O port to the memory unit in response to the first control signal; and
   a second tri-state buffer for transmitting the commands from the memory unit to the second data I/O port in response to the first control signal.

4. The micro controller development system in claim 1, wherein the micro controller includes a tri-state buffer for outputting the address signals to the first data I/O port in response to the first control signal.

* * * * *